UNITED STATES PATENT OFFICE.

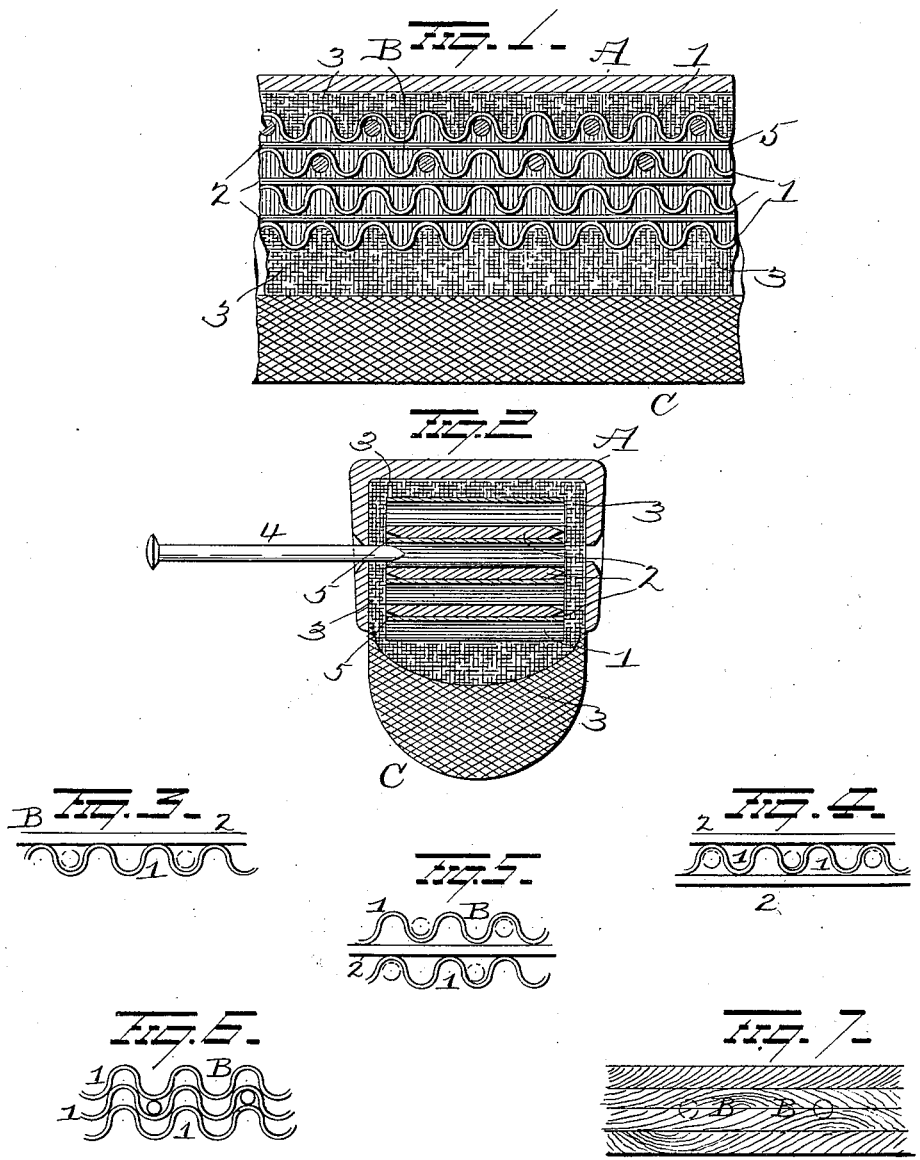

FERDINAND W. STARR, OF SPRINGFIELD, OHIO, ASSIGNOR, BY DIRECT AND MESNE ASSIGNMENTS, OF THREE-FOURTHS TO JOHN B. HOUSTON, WILLIAM S. LE FEVRE, AND JOHN C. LE FEVRE, OF SAME PLACE.

TIRE FOR VEHICLE-WHEELS.

SPECIFICATION forming part of Letters Patent No. 667,348, dated February 5, 1901.

Application filed June 27, 1900. Serial No. 21,804. (No model.)

*To all whom it may concern:*

Be it known that I, FERDINAND W. STARR, of Springfield, in the State of Ohio, have invented certain new and useful Improvements in Tires for Vehicle-Wheels; and I do hereby declare the following to be a full, clear, and exact description of the invention, such as will enable others skilled in the art to which it appertains to make and use the same.

My invention relates to an improvement in tires, and more particularly to such as have a yielding tread, one object of the invention being to construct a compound tire comprising a uniformly strong base or foundation portion and a tread portion and to so construct said base portion that it can be readily secured to a channel-iron rim by means of fastening devices passed transversely through it anywhere along its length, and thereby dispense with the usual circumferential tension-wires for holding the tire within a channel-iron rim and to make the same accessible to the general public by reason of its simple application.

A further object is to produce a tire which shall be simple in construction, comparatively cheap to manufacture, and which shall be effectual in all respects in the performance of the required functions.

With these objects in view the invention consists in certain novel features of construction and combinations and arrangements of parts, as hereinafter set forth, and pointed out in the claims.

In the accompanying drawings, Figure 1 is a longitudinal sectional view illustrating my invention. Fig. 2 is a cross-section. Figs. 3, 4, 5, 6, and 7 are views of modifications.

A represents a portion of the channel-iron rim of a wheel, which may vary to suit the shape of the improved base it is to hold; B, the frame-base or foundation portion of the tire, adapted to fit and to be securely held within the channel-iron rim, and C represents an elastic or yielding tread secured to the said base portion in any preferred manner.

The novelty of my invention resides more particularly in the construction or provision of a uniformly strong base portion in or for tires and the manner of securing it to the channel-iron rim, whether the same be united to the tread C before or after securing the same to the channel-iron.

In the form of the invention shown in Figs. 1 and 2 the base portion B of the tire comprises a series of transversely corrugated or crimped metallic ribbons or strips 1, between which flat metallic strips 2 are interposed, and the whole is wrapped with cord, canvas, cloth, or other suitable flexible material 3, which acts to muffle and cushion and to securely bind, incase, or embrace the metallic interior of the said base portion and also allows it to circumferentially fit varying diameters of channel-rims. The base or foundation portion thus constructed, and whether united with the tread portion first or last, is fitted into the channel-iron rim A and held securely therein by means of transverse screws or pins 4, which pass through the flanges of the channel-iron and said binding or covering and through the perforations formed by the corrugated strips. It will be observed that by the employment of corrugated strips numerous positive holding-ridges, perforations, or guideways for the transverse fastening devices are cheaply provided without boring or drilling. In fact, a continuous series of such securing-points, perforations, or guideways are formed thereby, so that the securing-pins can be safely passed through the base portion at any point without limitation or danger of any injury thereto. In order that the fastening pins or screws be made to pass freely through the portion B without conflict with the edge of the straight or flat metallic strips, the pins should be pointed, and the edges of the strips may be beveled or sharpened, as at 5, Fig. 2, and the holes in the flanges of the channel-iron rim should be countersunk for a like purpose, as shown. The tread portion is uniformly secured to the base portion B by means of cement or glue, by vulcanizing, or in any other preferred manner, and said tread portion may consist of rubber or other yielding material and may embrace the base portion to any desired extent.

It is not absolutely necessary that a series of corrugated strips be employed, as one will serve as guideways and holder for the pins, as shown in Fig. 3, and only one flat strip may be used, or a single corrugated strip with two flat strips may be used, as shown in Fig. 4, or two corrugated strips with a flat strip between them may be employed, as shown in Fig. 5, or corrugated strips without flat strips may be used, as in Fig. 6, or the strips may all be flat and of other material than metal—wood, for instance, as in Fig. 7, in which case the pointed transverse fastening devices 4 would readily enter between the flat strips and binding, and the said binding of the base portion B would yield sufficiently to let them pass and still securely grip them.

Various other changes might be made in the details of construction of my invention without departing from the spirit thereof or limiting its scope as relates to a uniformly strong base portion for tires, and I do not wish to limit myself to the precise details of construction herein set forth only, for it will no doubt be evident that even a single strip of wood or other material may be wrapped with cord, cloth, canvas, or even wire in order to bind and produce a strong muffled base portion which the insertion of the securing-pins would not split nor separate in use and which would be likewise capable of being safely perforated anywhere along its length for the insertion of said securing-pins, which is one of the important features and objects of my invention—namely, to provide a base or foundation portion which shall be capable of being safely secured within a channel-iron rim anywhere along its length, as hereinbefore stated. It may also be stated that said base portion is intended to be made practically waterproof, whether by saturation, vulcanization, or covering, and also that this compound tire may be constructed straight, circular, or spiral lengthwise, by which is meant that the tread portion may be united to or built up with the base portion while held together in a form, mold, or otherwise. In the latter case the diameter of the mold may be less than the wheel for which the compound tire is intended, and in opening out the spiral or coil form of the tire thus constructed would tend to condense the yielding outer tread portion, and thus in a measure increase its wearing quality and also give it a tendency to hug the channel-iron wheel-rim by reason of the extension from its normal position. The peculiar advantages arising out of the novel construction of said base portion are that it will bend readily in the required direction, that it has sufficient transverse resistance to admit of transverse fastening anywhere along its length, that it will not chafe within the rim-channel nor unpleasantly wriggle a vehicle, as a soft-rubber base does, and is peculiarly adapted to be united with a soft-rubber tread portion or other yielding tread substance; neither will it roll out of the channel-iron rim, as is often the case with tires held solely by means of tension-wires.

Any ordinary mechanic will be able to apply the improvements herein described.

Having fully described my invention, what I claim as new, and desire to secure by Letters Patent, is—

1. The combination with a channel-iron rim, of a tire comprising a base or foundation portion consisting of a strip and a binding or wrapping, adapted to permit the passage of transverse fastening devices at any point, and a tread portion secured to said base or foundation portion, substantially as set forth.

2. The combination with a channel-iron rim, of a tire comprising a base portion consisting of strips, a tread portion secured to the base portion and fastening devices passing transversely through the channel-iron rim and between the strips of the base portion, substantially as set forth.

3. The combination with a channel-iron rim, of a tire comprising a base portion and a tread portion united to the base portion, said base portion comprising strips bound with flexible material and pointed transverse fastening devices passing through the flanges of the channel-iron and through the base portion, between the strips thereof, substantially as set forth.

4. In a tire, a base portion having a corrugated strip therein adapted to form a continuous series of connecting-guideways for transverse fastening devices, substantially as set forth.

5. In a tire, a base portion having strips passing longitudinally through it, said strips being so disposed relatively to each other as to receive transverse fastening devices between them at any point, substantially as set forth.

6. In a tire, a base portion having a corrugated strip of metal and a flat strip of metal therein, substantially as set forth.

7. In a tire, the combination with a channel-iron rim, of a base portion comprising corrugated strips, interposed flat strips having beveled edges, fastening devices passing transversely through the flanges of the channel-iron and through grooves of a corrugated strip, and a tread portion secured to the base portion, substantially as set forth.

8. In a tire, the combination with a channel-iron rim, of a base portion comprising corrugated strips, a wrapping of flexible material inclosing said strips, fastening devices passing transversely through the flanges of the channel-iron rim and through grooves of a corrugated strip, and a yielding tread portion secured to the base portion, substantially as set forth.

9. In a tire, the combination with a channel-iron rim and a tread portion, of a base portion to which said tread portion is secured, said base portion being disposed between the tread and the rim and said base portion having unlimited transverse connecting-guideways for transverse fastening devices which pass through said base portion and the flanges of the channel-iron rim, substantially as set forth.

10. A base portion for a tire comprising corrugated strips and a binding of flexible material entirely inclosing and enveloping said strips, substantially as set forth.

11. The combination with a channel-iron rim, the flanges of which are made with holes and said flanges being countersunk around said holes, of a base portion consisting of strips, transverse fastening devices having pointed ends, passing through said flanges and base portion and a tread portion secured to the base portion, substantially as set forth.

12. The combination with a channel-iron rim having holes in its flanges and said flanges being countersunk around said holes, of a base portion consisting of strips having beveled edges, transverse fastening devices having pointed ends passing through said holes and between the strips of the base portion and a tread portion secured to the base portion, substantially as set forth.

13. A base portion for a tire comprising corrugated strips and a binding of flexible material entirely inclosing and enveloping said strips, the whole being waterproof, substantially as set forth.

In testimony whereof I have signed this specification in the presence of two subscribing witnesses.

FERDINAND W. STARR.

Witnesses:
 WM. W. KEIFER,
 JOHN B. HOUSTON.